United States Patent [19]
Radlmann et al.

[11] 4,104,324
[45] Aug. 1, 1978

[54] DEEP-DYEING POLYCAPROLACTAM FIBRES AND FILAMENTS

[75] Inventors: Eduard Radlmann; Hans-Georg Gelhaar; Günther Nischk, all of Dormagen, Germany

[73] Assignee: Bayer Aktiengesellschaft, Leverkusen, Germany

[21] Appl. No.: 835,310

[22] Filed: Sep. 21, 1977

[30] Foreign Application Priority Data

Sep. 24, 1976 [DE] Fed. Rep. of Germany ....... 2642980

[51] Int. Cl.$^2$ .............................................. C08L 77/00
[52] U.S. Cl. ............................. 260/857 TW; 528/324; 528/315
[58] Field of Search ................................. 260/857 TW

[56] References Cited

U.S. PATENT DOCUMENTS 3,161,608  12/1964  Caldwell .................... 260/857 TW

FOREIGN PATENT DOCUMENTS 749,479     5/1956  United Kingdom.
1,226,944   3/1971  United Kingdom.
1,263,952   2/1972  United Kingdom.

Primary Examiner—Paul Lieberman
Attorney, Agent, or Firm—Plumley and Tyner

[57] ABSTRACT

The invention is related to novel polycaprolactam filaments and fibres capable of being deeply dyed with acid dyes to give dye finishes with extreme fastness to light, characterized by the fact that they consist of physical mixtures of unmodified polycaprolactam and a basic polycaprolactam containing structural units corresponding to the formula:

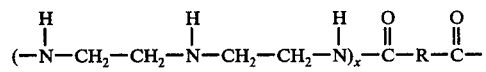

in which R represents an alkylene radical with 4 to 12 carbon atoms and x is an integer from 1 to 5, have relative solution viscosities of from 2.9 to 3.5 (as measured on solutions of 1 g of non-extracted polyamide in 100 ml of cresol at 25° C) and contain free amino groups in a concentration range from 60 to 180 millivals per kg of polymer mixture.

5 Claims, No Drawings

DEEP-DYEING POLYCAPROLACTAM FIBRES AND FILAMENTS

The present invention relates to polycaprolactam filaments or fibres capable of being deeply dyed with acid dyes.

It is known that the dyeability of aliphatic polyamides with acid dyes can be improved if the number of basic terminal groups is increased by using the diamine component of types consisting of dicarboxylic acids and diamines in a quantity above the stoichiometrically necessary quantity and by additionally using a diamine in the case of lactam types. One serious disadvantage of this approach is the reduction in molecular weight brought about by the excess of diamine, as a result of which it is no longer possible to spin filaments with satisfactory textile properties. In order to obviate this problem, attempts have been made to use amines containing more than two amine functions, for example bis-hexaméthylene triamine (U.K. patent specification No. 1,226,944), in order on the one hand to reduce the molar amine excess, i.e. to keep the molecular weight within reasonable limits, and on the other hand to compensate for the reduction in molecular weight in the form of an increase in melt viscosity by slight branching or crosslinking. The disadvantage of this process is an uncontrollable and nonreproducible branching or crosslinking under the polycondensation conditions described in U.S. Pats. Nos. 749,479 and 1,263,952 for increasing the molecular weight. In this process, the side effects of an improvement in dyeability represent difficulties in production of the polymers. In addition, the branches and crosslinks result in deterioration in the textile properties, e.g. strength, of the filaments or fibres.

Accordingly, it is an object of the present invention to provide filaments and fibres of aliphatic polyamides which can be produced without difficulty and which can be dyed in deep colours using acid dyes without any deterioration in the textile properties in comparison with the normal types, the dye finishes thus obtained showing high light stability.

It has now been found that filaments and fibres capable of being deeply dyed with acid dyes and showing no deterioration in their favourable textile properties by comparison with unmodified polycaprolactam filaments, coupled with high light stability values of the dyes finishes, can be obtained by mixing a fully condensed normal polycaprolactam with a definite amount of a basic polyamide concentrate which is also fully condensed and processing the resulting mixture into filaments or fibres.

Accordingly, the present invention provides novel polycaprolactam filaments and fibres capable of being deeply dyed with acid dyes to give dye finishes with high light stability, characterised by the fact that they consist of physical mixtures of unmodified polycaprolactam and a basic polycaprolactam containing structural units corresponding to the formula:

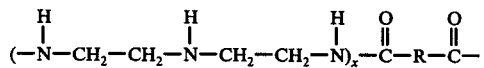

in which R represents an alkylene radical with 4 to 12 carbon atoms and x is an integer from 1 to 5, have relative solution viscosities of from 2.9 to 3.5 (as measured on solutions of 1 g of non-extracted polyamide in 100 ml of cresol at 25° C) and contain free amino groups in a concentration range from 60 to 180 millivals per kg of polymer mixture.

It is another object of the present invention to produce these basically modified polycaprolactam filaments by introducing a conventionally produced, linear basic polycaprolactam concentrate containing a large number of free secondary amino groups in a predetermined amount through a metering screw at temperatures in the range from 200° to 250° C into a fully condensed polycaprolactam melt just before the spinning process and just in front of the spinneret, followed by intensive mixing for 3 to 4 minutes and spinning into filaments. This procedure virtually precludes trans-amidation reactions so that the two polyamides are present in the form of a physical mixture and no deterioration in the properties of the filaments can be detected. The strengths of the filaments, which are at the same level as those of pure polycaprolactam, provide for problem-free texturing and co-texturing and show high light stability values of the dye finishes.

The basic polycaprolactams are produced by polycondensing aliphatic polyamines corresponding to the general formula:

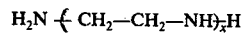

in which x is an integer from 1 to 5, preferably diethylene triamine, with an aliphatic dicarboxylic acid or a diester thereof corresponding to the general formula:

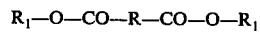

in which R represents an alkylene radical with 4 to 12 carbon atoms and $R_1$ represents an alkyl radical with 1 to 5 carbon atoms or hydrogen, together with a lactam, such as, $\epsilon$-caprolactam, or an aminocarboxylic acid, such as $\epsilon$-amino-caproic acid, in the melt, at temperatures of from 100° to 210° C, in the absence of oxygen, in an inert gas atmosphere, for example nitrogen, argon or hydrogen, and under pressures of from 760 to 0.001 Torr.

The quantitative ratios between the starting components are so selected that the concentration of free secondary amino groups amounts to between 500 and 2000 mval per kilogram of polyamide. In addition, it is essential for the production of linear, unbranched concentrates to use an excess of polyamine over and above the stoichiometrically necessary quantity. In the case of an excess of dicarboxylic acid, the products crosslink. In addition, the condensation temperature should be in the range of from 100° to 210° C in order to obtain substantially colourless polyamide concentrates. In order to obtain a particularly good natural colour, it has also proved to be particularly favourable to add small quantities of a reducing agent, such as hydrazine sulphate for example.

After full condensation, the highly viscous melt is extruded into homogeneous strands which are converted by means of a granulator into a readily feedable granulate which can be added to and mixed with the polycaprolactam melt without difficulty before passing the spinneret through a metering screw. A concentrate with a high content of amino groups is more favourable insofar as only small quantities need be added.

The polyamide mixtures obtainable by the process according to the invention may readily be spun into filaments with extremely good textile properties, textured and dyed in deep colours with acid dyes.

The relative solution viscosities $\eta_{rel}$ quoted in the following Examples were measured at 25° C on solutions of 1 g of non-extracted substance in 100 ml of m-cresol.

The parts by weight used in the Examples are to parts by weight as kilograms are to liters.

EXAMPLE 1

A. Production of a basic polycaprolactam concentrate

In a polycondensation apparatus, a mixture of 33.900 parts by weight of ε-caprolactam, 5.47 parts by weight of adipic acid, 4.056 parts by weight of diethylene triamine and 0.2 parts by weight of hydrazine sulphate was heated under nitrogen while stirring to a temperature of 190° C. After 3.5 hours, most of the water had been split off. The pressure was then reduced to 3 mm and the temperature was increased to 210° C. After another 3 hours under these conditions, the condensation reaction had ceased. The viscous melt was then spun off onto a drying belt and the strands obtained were granulated. The homogeneous, pale yellow coloured granulate may be characterised as follows:

Relative viscosity $\eta_{rel}$ = 2.70
Water content = 0.01%
Nitrogen content (amino groups): 1058 millivals/kg
Softening range: 168° – 172° C.

B. Production of basically modified polycaprolactam filaments

The basic concentrate described in Example 1 A was melted in a Barmag three-zone extruder (l = 12 d, d = 30 mm). The nominal temperatures were adjusted to 230°, 240° and 250° C so that the temperatures in the product amounted to about 210°, 240° and 250° C. The melt pressure in the extruder was 25 bars. The concentrate is delivered by an extruder to a gear pump which pumps it into a master melt of polycaprolactam (with a terminal amino group content of 32 millivals per kg and a relative viscosity $\eta_{rel}$ of 3.2). After adjustment of the delivered quantity of 5.7% by weight, its drive was firmly coupled with that of a pump delivering the master melt. This ensured the delivery of a constant amount of concentrate.

The two melts were mixed over a period of 3 minutes in a dynamic Wiemann mixer at a nominal temperature of 270° ± 10° C. The resulting homogeneous mixture was then delivered to the spinning beam and spun into filaments which, after texturing, had a denier of dtex 950 f 42. The amino group content of these filaments was determined by analysis at 91 millivals per kg. Using the acid dye Telon Echtgelb 4 GL (corresponds to Supranol 4 GL), colour index; acid yellow, the filaments can be dyed in a deep colour with a stability to light of 5-6. The filament material had a relative viscosity $\eta_{rel}$ of 3.14.

EXAMPLE 2

A. Production of a basic polycaprolactam concentrate 57.3 Parts by weight of ε-caprolactam, 29.2 parts by weight of adipic acid, 21.6 parts by weight of diethylene triamine and 0.5 part by weight of hydrazine sulphate were heated in a condensation apparatus under nitrogen while stirring to a temperature of 200° C. After about 3 hours, most of the water had been split off. The condensation reaction was continued for another 4.5 hours under normal pressure. Thereafter, the melt was spun off onto a drying belt and granulated in the same way as described in Example 1. The pale yellow coloured granulate had the following properties:

Relative viscosity $\eta_{rel}$ = 1.95
Water content: 0.03%
Nitrogen content (amino groups): 2015 millivals/kg
Softening range: approx. 95° –107° C.

B. Production of basically modified polycaprolactam filaments

The concentrate produced in accordance with Example 2 A was melted in the same Barmag three-zone extruder (l = 12 d, d = 30 mm) with cooling of the feed zone at nominal screw temperatures of 210°, 220°, 230° C and a melt pressure of 30 bars, and was introduced in a quantity of 3.0% by weight into the master melt stream of the polycaprolactam which had a terminal amino group content of 32 millivals per kg and a relative viscosity $\eta_{rel}$ of 3.2. At a nominal temperature of 270° ± 10° C, the two melts were thoroughly mixed for 3 minutes in the following dynamic Wiemann mixer. After passing the spinning beam, the homogeneous mixture was spun into filaments which after texturing, had a denier of dtex 1900 f 90. The analytically determined amino group content amounted to 90 millivals per kilogram. Using the acid dye Telon Echtrot DB (corresponds to Supranol Fast Red BB), Colour Index: Acid Red 154, the filaments can by dyed in a deep red colour with a stability to light of 6. The filaments had a relative viscosity $\eta_{rel}$ of 3.11.

EXAMPLE 3

A. Production of a basic polycaprolactam concentrate

As in Examples 1 and 2, 154.8 parts by weight of triethylene tetramine, 202.0 parts by weight of sebacic acid, 688 parts by weight of caprolactam and 0.6 part by weight of hydrazine sulphate were condensed under nitrogen for 7 hours at 210° C in a polycondensation apparatus. The viscous melt was then spun off onto a drying belt and worked up into a pale-yellow coloured granulate. The properties of the basic concentrate were as follows:

Relative viscosity: $\eta_{rel}$ = 1.99
Water content: 0.02%
Nitrogen content (amino groups): 1011 millivals/kg.
Softening range: Approx. 160° C.

B. Production of basically modified polycaprolactam filaments

As described in Example 1 B, the basic concentrate obtained in accordance with Example 3 A was introduced in a quantity of 8.5% by weight into the polycaprolactam melt stream ($\eta_{rel}$ = 3.2, 32 millivals of terminal amino groups per kg) by means of a Barmag three-zone extruder (n = 12 d, d = 30 mm). The feed zone of the extruder was cooled with water, the nominal screw temperatures were 230° C, 250° C and 250° C and the melt pressure was kept at 30 bars. In the following dynamic Wiemann mixer, the two melts were intensively mixed for 3 to 4 minutes at a nominal temperature of 270° ± 20° C. The homogeneous melt was then delivered to the spinning beam and spun into filaments which, after texturing, had a denier of dtex 1330 f 63. The analytically determined amino group content amounted to 122 millivals per kg, whilst the relative viscosity value $\eta_{rel}$ is 3.08. Using the acid dye Telon Echtrot DB (corresponds to Supranol Fast Red BB), Colour Index: Acid red 154, the filaments could be dyed in deep red colours with a value for the light stability of 6.

What we claim is:

1. Basically modified polycaprolactam filaments or fibres comprising a physical mixture of an unmodified polycaprolactam and a basic polycaprolactam containing structural units corresponding to the formula:

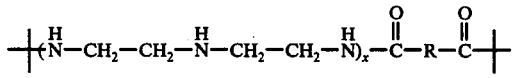

in which
R represents an alkylene radical with 4 to 12 carbon atoms, and
$x$ is an integer from 1 to 5, having a solution viscosity of from 2.9 to 3.5 (as measured on a solution of 1 g of non-extracted polyamide in 100 ml of m-cresol at 25° C) and containing free amino groups in a concentration range from 60 to 180 millivals per kg of fibre.

2. Basically modified polycaprolactam filaments or fibres as claimed in claim 1, wherein the basic polycaprolactam contains structural units of the formula:

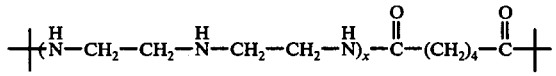

in which $x$ is an integer from 1 to 5.

3. A process for the production of basically modified polycaprolactam filaments or fibres comprising a physical mixture of an unmodified polycaprolactam and a basic polycaprolactam, wherein a basic polycaprolactam concentrate containing structural units of the formula

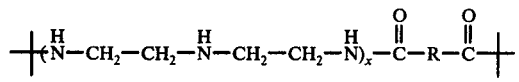

in which
R represents an alkylene radical with 4 to 12 carbon atoms, and
$x$ is an integer from 1 to 5, with a concentration of amino groups of from 500 to 2000 millivals per kg of polyamide is delivered in a quantity which guarantees an amino group content of from 60 to 180 millivals per kg in the spun filaments through a metering screw at a temperature of from 200° to 250° C to a fully condensed unmodified polycaprolactam melt just before the spinning process and just before passing the spinneret and intensively mixed therewith for 3 to 4 minutes and wherein the resulting mixture is spun into filaments or fibres.

4. A process as claimed in claim 3, wherein the basic polycaprolactam contains structural units of the formula:

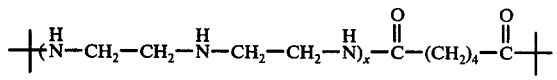

in which
$x$ is an integer from 1 to 5.

5. A process as claimed in claim 3, wherein the basic polycaprolactam is used in a quantity such that the spun fibres or filaments have a concentration of amino groups of 150 millivals per kg.

* * * * *